United States Patent [19]

Tellerman

[11] Patent Number: 4,726,226

[45] Date of Patent: Feb. 23, 1988

[54] DISTANCE AND TEMPERATURE MEASURING SYSTEM FOR REMOTE LOCATIONS

[75] Inventor: Jacob Tellerman, Bayside, N.Y.

[73] Assignee: MTS Systems Corporation, Eden Prairie, Minn.

[21] Appl. No.: 903,260

[22] Filed: Sep. 3, 1986

[51] Int. Cl.⁴ .................. G01B 7/26; G01F 23/30; G08C 15/00; G01K 13/00
[52] U.S. Cl. .......................... 73/292; 73/313; 324/208; 324/226; 340/870.13; 340/870.19; 374/142
[58] Field of Search .............. 324/207, 208, 226; 73/290 R, 290 V, 291, 292, 313, 314; 374/142; 340/870.11, 870.13, 870.15, 870.17, 870.19, 870.2, 870.23, 870.24, 621, 623; 367/127

[56] References Cited

U.S. PATENT DOCUMENTS

| | | | |
|---|---|---|---|
| 3,537,085 | 10/1970 | Mayer et al. | 73/292 X |
| 3,898,555 | 8/1975 | Tellerman | 324/34 |
| 4,236,144 | 11/1980 | Sunagawa | 73/292 X |
| 4,305,283 | 12/1981 | Redding | 324/208 X |
| 4,361,037 | 11/1982 | Hauschild et al. | 73/292 X |
| 4,503,419 | 3/1985 | Kidd et al. | 73/292 X |
| 4,571,095 | 2/1986 | Stoffels | 374/167 |

*Primary Examiner*—Gerard R. Strecker
*Attorney, Agent, or Firm*—Kinney & Lange

[57] ABSTRACT

A measurement system for remotely measuring a parameter and relative distance having a parameter sensor providing signals to control the pulse repetition rate of a pulse generator, the pulses from the pulse generator in turn controlling a switch to alternately connect and disconnect an energy storage device to the input of a sonic waveguide device. The output signals at the outputs of the sonic waveguide device control a driving device which provides a representation of these output signals on a transmission line arrangement.

9 Claims, 1 Drawing Figure

DISTANCE AND TEMPERATURE MEASURING SYSTEM FOR REMOTE LOCATIONS

Reference is hereby made to U.S. Pat. No. 3,898,555 by J. Tellerman, entitled Linear Distance Measuring Device Using a Moveable Magnet Interacting with a Sonic Waveguide which was issued on Aug. 5, 1975. This patent discloses a sonic waveguide for use in measuring distances.

BACKGROUND OF THE INVENTION

Field of the Invention

The present invention relates to measurement of temperatures and distances at remote locations followed by transmitting the results, and more particularly, to systems transmitting such measured information in the form of relative timings of electrical pulses.

Many situations arise where information is measured at one location and then the results thereof are transmitted to another location for the convenience of the user. The usual desire to reduce material cost and system complexity makes advantageous the use of the simplest and most inexpensive means for transmitting such information permitted by the circumstances. This typically means the use of some sort of electrical cabling. Cost and complexity will normally then be minimized by choosing cabling having as few conductors as possible for a suitable type of cable.

A common situation requiring measurements of this sort is the desire to measure the volume of the contents of a tank and the temperature or other parameter of such contents, this information to be reported to a central data collection area for record keeping or for control purposes, or both. The liquid contents of a tank of fixed size can be measured by noting the distance of the liquid surface from the top of the tank.

A basis for such a measurement is the Wiedemann Effect where an electrical conductor conducting an electrical current pulse therealong will experience a twisting effect at the point that the magnetic field induced by the pulse interacts with any other magnetic field encountered along its path. This twisting effect will lead to a torsional sonic pulse transmitted along the same conductor. A better result is obtained if the electrical conductor is a thin wire mounted inside a thin-walled, ferromagnetic material tube, the wire and tube together forming a sonic waveguide.

If such a waveguide is placed vertically in the tank extending down to near the bottom thereof, and if a float containing a magnet is allowed to move along the sonic waveguide in response to the level of liquid in the tank, the distance of the top of the liquid to the top of the tank can be measured. An electrical pulse sent down the electrical conductor in the sonic waveguide, having a magnetic field associated therewith, will, upon reaching the float, interact with the magnetic field provided by the magnet in the float. At that point, a torsional sonic pulse will be transmitted along the tube which will be conveyed back to the operating circuitry associated with the waveguide at a reference position thereon at or near the top of the tank.

A mode converter is provided on that part of the sonic waveguide tube occurring at the reference location which is formed as a pair of flat straps, or tapes, fixed on opposite sides of the tube. Each of these tapes is formed of a magnetostrictive material. A torsional sonic pulse along the tube reaches the tapes and momentarily expands one and simultaneously momentarily contracts the other tape. This pulsed contraction and expansion of the tapes causes a magnetic change in wiring coils surrounding each of the tapes to thereby provide an electrical signal across these coils. The coils are interconnected so that the signals in each add to provide a signal of suitable size to indicate the arrival of the sonic torsional pulse at the tapes. A permanent magnet provides an initial magnetic bias for such coils.

Thus, the time duration from the start of the electrical pulse down the sonic waveguide wire conductor until the return of the sonic pulse on the waveguide tube (which is transformed into an electrical pulse by the mode converter) is a measure of the distance to the magnet in the float because of the known propagation velocity of such pulses. Hence, the distance is measured to the surface of the liquid. The propagation time of the electrical pulse down the electrical conductor is negligable compared to the propagation velocity of the sonic torsional pulse along the tube. The sonic torsional pulse propagation velocity will be determined by the modulus elasticity of the tube which can be made independent of temperature for certain choices of material.

Sensing the temperature of the liquid in a tank can be readily accomplished by the use of either temperature sensitive resistors or of temperature sensitive semiconductor devices. Such sensors typically provide a voltage thereacross which is indicative of the temperature of the region in which such devices are located. For most tank situations, for example, there will be a desire to know the temperature at several locations in the tank and, therefore, several sensors would be spotted about the tank at those locations.

The results measured concerning the liquid contents of a tank in this example must then be conveyed to the user, typically at some centralized location. Therefore, a system for operating these kinds of sensors and for conveying the results of such measurements along a simple and cost effective transmission path is desirable.

SUMMARY OF THE INVENTION

The present invention provides a temperature controlled pulse generator repeatedly providing electrical pulses to a sonic waveguide inducing return sonic pulses from a measured point on the waveguide which are sensed by a mode converter. The mode converter pulses are provided on a transmission line.

DETAILED DESCRIPTION OF THE PREFERRED EMBODIMENTS

Figure 1:
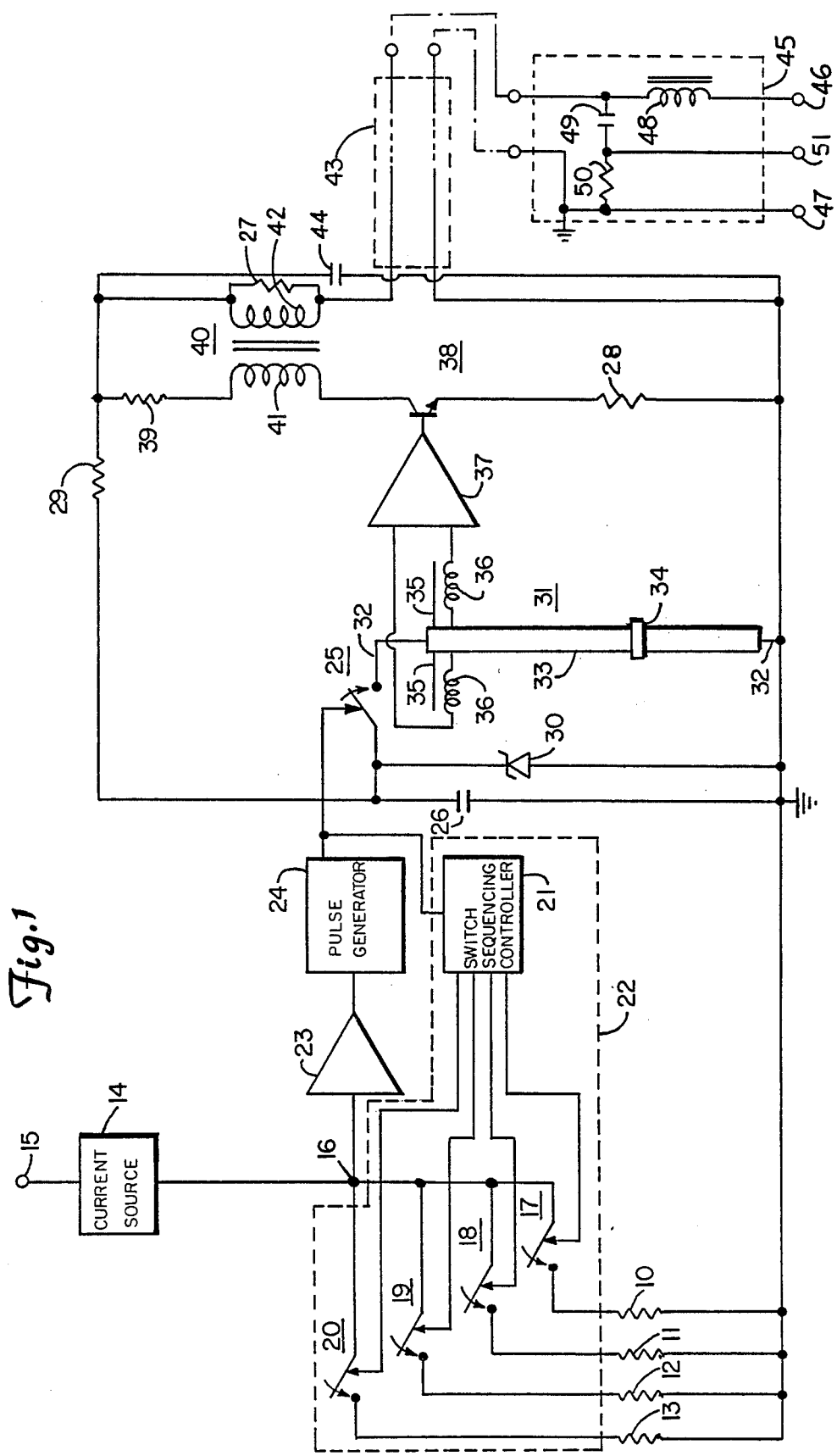
FIG. 1 shows a schematic diagram of a system embodying the present invention.

FIG. 1 shows a system for making distance and temperature measurements, and transmitting this information over a transmission line to a place convenient for making use of such information. Two fixed value resistors, 10 and 11, are used, with each having a different resistance value and each serving as a reference resistor. Each has one terminal thereof connected to the ground reference voltage. Resistors 10 and 11 (which may be composite resistors to achieve the following goals) are very stable resistors having accurate resistance values and which are substantially unaffected by temperature.

A further pair of resistors, 12 and 13, are each, for example, temperature sensing resistors. They each respond to temperature changes in a known manner by having a voltage drop thereacross, due to a constant current therethrough, reflect the temperature at which these resistors are then operating. If there are several points at which temperature is to be measured, there will be more than two such temperature sensing resistors so that the use of just resistors 12 and 13 in FIG. 1 is an example only. Each of resistors 12 and 13 also has one terminal thereof connected to ground.

The nominal resistance value chosen for resistors 12 and 13 depends on the type of sensing resistor used and so can vary widely. The values chosen for reference resistors 10 and 11 is to have one with a resistance greater than that reached by either of resistors 12 and 13 in operation, and the other with a resistance less than that reached by either of them in operation. Though temperature sensing resistors 12 and 13 are shown in FIG. 1, along with reference resistors 10 and 11, and although sensing temperature is the example given, other kinds of sensors for sensing temperature, or for sensing other kinds of parameters, can be adapted for use in the system of FIG. 1.

A current source, 14, is provided for electrically energizing resistors 10 through 13. Current source 14 is connected to a terminal, 15, adapted for connection to a source of voltage which may be provided via the transmission line described below. The other side of terminal 15 is connected to a circuit node, 16, from which current is supplied by a set of controlled switches to resistors 10 through 13.

The first of these controlled switches, 17, is capable of connecting the remaining terminal of resistor 10 to node 16. The second switch, 18, is capable of connecting the remaining terminal of resistor 11 to node 16. The third switch, 19, is capable of electrically connecting the remaining terminal of resistor 12 to node 16. Finally, the last switch, 20, is capable of connecting the remaining terminal of resistor 13 to node 16. In practice, switches 17 through 20 may satisfactorily be formed by transistors, typically metal-oxide-semiconductor field-effect-transistors (MOSFET's) which may be complementary MOSFET's (CMOS). These switches will typically have some "on" resistance and an "off" resistance that is less than infinite.

The use of the switches 17 through 20 is to permit connecting resistors 10 through 13, respectively, sequentially but alternatively to node 16. This sequential switching is controlled by a switch sequencing controller, 21. Switch sequencing controller 21 and switches 17 through 20 form a switch sequencer, 22, shown in dashed lines in FIG. 1. Controller 21 is shown operating the control regions of switches 17 through 20 to cause them to open or close as directed by controller 21. The circuits in controller 21 are well known combinational logic circuits providing a suitable logic function for the present system. The function of sequencer 22 can be provided, for example, substantially by an analog multiplexer and combinational logic circuits.

Whenever one of switches 17 through 20 is in the closed position, current from current source 14 passes through node 16, the closed switch and its corresponding resistor among resistors 10 through 13. The resulting voltage across such resistor is then also present at node 16 where it is sensed by an amplifier, 23. The input region of amplifier 23 is connected to node 16 while the output region is connected to the input of a pulse generator, 24.

An alternative arrangement to that shown for sequencer 22 to reduce sensing errors is based on having switch sequencing controller 21 control another set of switches used for sensing only, with switches 17 through 20 used only to supply current to resistors 10 through 13, respectively. The connection between the input of amplifier 23 and node 16 is eliminated and, instead, the input of amplifier 23 is connected to one side of each of the additional switches. The other side of each of these additional switches is connected to the same side of one of resistors 10 through 13 as is a corresponding one of switches 17 through 20. The same signal from switching sequencer 21 used to operate one of switches 17 through 20 can also be used to operate its corresponding additional switch connected to the same one of resistors 10 through 13. In these circumstances, voltage drops across the "on" resistances of switches 17 through 20 are eliminated from the signals amplified by amplifier 23.

Pulse generator 24 repetitively provides an electrical pulse at its output terminal which is electrically connected to a further controlled switch, 25. A pulse from pulse generator 24 to the control region of switch 25 causes that switch to close, switch 25 being open in the absence of such a pulse. Switch 25 can again be formed by a transistor, typically by a npn bipolar transistor which may have some "on" resistance and a high, though not necessarily infinite, "off" resistance.

The rate of repetition of the pulses provided by pulse generator 24 is controlled by the signals provided at circuit node 16. These signals, again, are the sequentially provided voltage drops across each of the resistors 10 through 13. These signals at node 16 are amplified by amplifier 23 before being provided to pulse generator 24. Thus, an increase in temperature at one of the resistors 10 through 13 connected to node 16 can lead to an increase in voltage at node 16 which leads to an increase in the duration between pulses at the output of pulse generator 24. A decrease in temperature provides the opposite result. The result is that the duration between pulses represents the temperature information provided by that one of resistors 10 through 13 connected to node 16 by switch sequencer 22.

A typical construction for pulse generator 24 would be to have a monostable multivibrator that has a state switching time after initialization which depends on the voltage applied at the input of pulse generator 24. The change of state after the completion of its timing state in the monostable multivibrator, in addition to being provided to switch 25, is provided to an astable multivibrator within impulse generator 24 which will then provide an output signal to the monostable multivibrator which is used to reinitialize the monostable multivibrator to again enter the timing state. Such multivibrator circuits are well known.

Further, the repetitive pulses from the output region of pulse generator 24 are provided to switch sequencing controller 21. These pulses initiate switch sequencing controller 21 into sequentially switching switches 17 through 20 from the open to the closed position so that the next switch in the sequence is caused to close by the next pulse from pulse generator 24 with the preceding switch opening.

A capacitor, 26, used as an energy storage means, is continually charged from direct current supplied along a transmission line. Such charging occurs from the transmission line, to be described below, through a resistor, 29, connected in series which limits the amount of current flowing to storage capacitor 26. Furthermore, a Zener diode, 30, is used to limit the voltage to which capacitor 26 can be charged to provide relatively uniform discharging pulses to the above-mentioned distance measuring sonic waveguide, designated 31 in FIG. 1, to which energy in capacitor 26 will be repeatedly provided. The resistance value for resistor 29 is typically 1000Ω and the capacitance value of capacitor 26 is typically 0.33 $\mu$f.

One terminal of each of capacitor 26 and diode 30 is connected to ground. The remaining terminal of each is connected to the terminal or terminating region on one side of switch 25. The other terminal on the other side of switch 25 is connected to the conductor, 32, provided within sonic waveguide 31, as set out above. Electrical conductor 32 is located in the interior of the ferromagnetic material tube, 33, and is connected to ground on one end thereof opposite the one connected to switch 25.

This arrangement leads to the repetitive pulses of varying periods from pulse generator 24 acting to close switch 25 repetitively with a varying period to thereby discharge capacitor 26 repetitively with a varying period through conductive wire 32 of sonic waveguide 31. Such electric pulses propagate down electrical conductor 32 until the magnetic field associated therewith encounters the magnetic field due to the magnet in the float, 34. The resulting torsional sonic pulses travel along tube 33 until reaching the mode converter tapes, 35. The resulting motion of tapes 35 causes electrical signals to repeatedly form across the mode converter wiring coils, 36, wrapped about each of tapes 35. Because the opposite ends of series connected coils 36 are connected to the input terminals or regions of a differential amplifier, 37, these electrical signals are provided to such input regions of amplifier 37. Amplifier 36 serves as an amplifier for the mode converter providing an amplified voltage pulse at its output for each pulse sensed at tapes 35 and coils 36.

The output region of mode converter differential amplifier 37 is connected to the control region of a driving circuit which has a relatively high effective impedance in the absence of such pulses because of use of a npn bipolar transistor, 38. Reduction of the effective impedance of transistor 38 in response to an electrical pulse on its base from amplifier 37 and coils 36, because of a sonic torsion pulse affecting tapes 35, permits a current pulse to flow through a further resistor, 39, with a resistance value of 200Ω and through the primary of a transformer, 40. This current pulse flows through a primary wiring coil, 41, of transformer 40 which is connected between resistor 39 and the collector of transistor 38. The emitter of transistor 38 is connected through a biasing resistor, 28, of 110Ω resistance value to ground. Transistor 38 can be operated as a switch, but here has been chosen to be operated as an analog pulse amplifier.

Magnetic coupling of the pulse in primary coil 41 causes an electrical pulse to appear in a secondary wiring coil, 42, of transformer 40 from whence it is supplied to one of two conductors in a transmission line, 43. Secondary coil 42 has one end connected to the junction of resistors 29 and 39 and the other end to the conductor on transmission line 43. A direct voltage and corresponding current is provided by transmission line 43 so that the pulse from secondary coil 42 occurs and is propagated on transmission line 43 as an addition to this direct current. The other conductor in transmission line 43 is connected to the ground reference voltage. A resistor, 27, is connected across secondary coil 42 to adjust the impedance occurring at the connections to transmission line 43 with a value of 110Ω. A capacitor, 44, is connected from the juncture of resistors 29 and 39 to ground to, in effect, place secondary coil 42 across the two conductors on transmission line 43 at pulse signal frequencies, and has a value of 0.047 $\mu$f. A 0.1 $\mu$f capacitor can be connected at the juncture of resistor 39 and primary coil 41 to ground to bypass resistor 39 to provide efficient pulse power to primary coil 41.

Because of magnetic induction, closure of switch 25, due to pulses from generator 24, to thereby provide an electrical pulse on electrical conductor 32 of sonic waveguide 31 will also lead to a signal being developed in coils 36. Such a signal from coils 36, after being amplified by amplifier 37 and applied to the base of transistor 38, will also cause transistor 38 to reduce its effective impedance in correspondence with the provision of a pulse on waveguide conductor 32, just as does a return sonic pulse on waveguide 31. As a result, the user at the far end of transmission line 43 will experience a pulse each time switch 25 is closed by pulse generator 24, and will also receive a pulse each time a sonic torsion pulse returns to tapes 35. The system of FIG. 1 is operated so that the duration between pulses provided by pulse generator 24 is quite long compared to the duration and the return delay of the sonic torsion pulse along waveguide 31.

As a result of this system arrangement, the user at the far end of transmission line 43 will have sufficient information conveyed to that location to enable the determination of the distance from the sonic waveguide reference position to the float, and of the termperatures of various locations in the tank reported on a sequential basis. The time duration between pulses on transmission line 43 due to the closing of switch 25, as controlled by signals at node 16, will provide information as to the temperature experienced by each resistor sequentially connected to node 16. The time duration between the closing of switch 25 and the return of a corresponding sonic pulse to tapes 35 represents the distance that float 34 is from tapes 35.

The direct voltage and current can be supplied on transmission line 43, and the pulse signals received at the far end of line 43, by use of many different circuits, including the simple circuit, 45, shown in FIG. 1. A constant voltage, typically 26 volts, is supplied at a terminal, 46, with respect to ground at another terminal, 47. Incoming pulses are blocked by a choke coil, 48, from reaching terminal 46. The pulses are passed through a capacitor, 49, and across a resistor, 50. Such pulses are passed to a terminal, 51. Recording means or some operating means, or both, between terminals 51 and 47 can then derive the distance and temperature information from the incoming pulses by noting the sequence and timing thereof. A microprocessor based system could be used for this purpose.

Because of amplifier offsets and gain changes and voltage reference changes, current source and current changes, capacitor value shifts, resistor value shifts, and the like, the results for the temperature measurements in the system of FIG. 1 are subject to drifts and other inaccuracies. Such inaccuracies can be avoided by making the temperature measurements relative to calibration measurements made using reference resistors 10 and 11. A different one of resistors 10 through 13 is connected to node 16 in each successive duration between pulses from pulse generator 24. If resistors 10 and 11 are quite stable so that the durations between pulses from pulse generator 24 vary substantially only because of other component change problems in the system, this information on the change of other components is in effect known and can be used to interpret the information in the durations between pulses from pulse generator 24 due to the sensing resistors 12 and 13.

One approach to making use of such calibration measurements is to assume that the measured time intervals between pulses from pulse generator 24, as set by resistors 10 and 11, is a linear function of the stable values of resistance of resistors 10 and 11. Then two linear equations result, one for each measurement, with these equations each having two unknown constants, as is generally true for such linear equations. These constants can be determined from the two equations by usual algebraic based methods. The constants found can then used as the constants in linear equations assumed to hold between (i) the durations between pulses from pulse generator 24, and (ii) the resistance values of sensing resistors 12 and 13 when these resistors are connected at node 16. The resistance values found from such equations can be used to find the temperatures experienced by such resistors through knowledge of their temperature characteristics. This process of determinating these constants and finding temperatures can be practiced by a user at the far end of transmission line 43 through performing such calculations, as long as the sequence of resistor connections to node 16 is understood by that user.

What is claimed is:

1. A measurement system for measuring a parameter and a distance from a reference at remote locations, said measurement system comprising:
   a parameter sensing means having an output region, said parameter sensing means being capable of providing parameter signals at said parameter means output region representative of parameter values being sensed;
   a pulse generating means having an input region and an output region, said pulse generating means being capable of providing a repetitive electrical pulse signal at said pulse generating means output region in which durations between pulses are controlled in extent by magnitude values of signals applied to said pulse generating means input region, said pulse generating means input region being electrically connected to said parameter sensing means output region;
   a first switching means having first and second terminating regions and having a control region by which said first switching means can be directed to provide a conductive path of a selected conductivity between said first switching means first and second terminating regions, said first switching means control region being electrically connected to said pulse generating means output region;
   an energy provision means having first and second terminal regions and being capable of providing electrical energy therebetween, said energy provision means first terminal region being electrically connected to said first switching means first termination region;
   a sonic waveguide means having an electrical conducting means located between first and second input terminal regions with there being a magnetic means selectively movable along said sonic waveguide means and with there being a converter means affixed to a selected reference position along said sonic waveguide means for providing electrical signals at a first output terminal region in response to occurrences of sonic torsion pulses occurring thereat representing a position of said magnetic means, said sonic waveguide means first input terminal region being electrically connected to said first switching means second terminating region and said sonic waveguide means second input terminal region being electrically connected to said energy provision means second terminal region;
   a first driving means having first and second terminating regions and having a control region by which said first driving means can be directed to provide a conductive path of a selected conductivity between said first driving means first and second terminating regions, said first driving means control region being electrically connected to said sonic waveguide means first output terminal region; and
   a transmission line means having first and second input terminal regions and having an output at which access is provided to signals transmitted along said transmission line means, said transmission line means first input terminal region being electrically connected to said first driving means first terminating region, and said transmission line means second input terminal region being electrically connected to said first driving means second terminating region.

2. The apparatus of claim 1 wherein said parameter sensing means comprises a temperature sensitive resistor electrically connected to a first terminal means adapted for electrical connection to a first source of current.

3. The apparatus of claim 1 wherein said energy provision means comprises a capacitor.

4. The apparatus of claim 1 wherein said sonic waveguide converter means is a mode converter means having first and second output terminal regions at which electrical signals occur in response to sonic torsion pulses occurring at said reference position of said mode converter means, and wherein said sonic waveguide mode converter means further comprises a mode converter means differential amplifier having first and second input regions and an output region, said mode converter means differential amplifier first input region being electrically connected to said mode converter means first output terminal region and said mode converter means differential amplifier second input region being electrically connected to said mode converter means second output terminal region, said mode converter means differential amplifier output serving as said first sonic waveguide means first output terminal region.

5. The apparatus of claim 1 wherein said transmission line means has an electrical transformer connected between said transmission line means first input terminal region and said transmission line means output.

6. The apparatus of claim 2 wherein there is a plurality of temperature sensing resistors each electrically connected through a sensor switching means to said first terminal region, and said apparatus further comprises a switch sequencer having an input region which sequentially and alternatively directs electrical connection of each of said temperature sensing resistors to said first terminal means by said switches upon switching initiation signally occurring at said switch sequencer input region, said switch sequencer input being electrically connected to said pulse generating means.

7. The apparatus of claim 4 wherein said sonic waveguide means is formed of a tubular member of ferromagnetic material with said electrical conducting means located within said tubular means.

8. The apparatus of claim 5 wherein said transformer has primary and secondary wiring coils arranged to magnetically interact with one another and said transformer primary coil has one terminal thereof electrically connected to said transmission line means first input region and said transformer secondary coil has one terminal thereof electrically connected to said transmission line means output, and with remaining terminals of said primary and secondary coils each being electrically connected to one another.

9. The apparatus of claim 6 wherein said temperature sensing means further comprises a temperature sensing amplifier having an input region and an output region, said temperature sensing amplifier input region being electrically connected to said plurality of temperature sensing resistors and said temperature sensing amplifier output region serving as said temperature sensing means output region.

* * * * *